Jan. 3, 1939.    H. W. FALK ET AL    2,142,723
MEANS FOR CORRELATING GEARS
Filed Sept. 18, 1935    2 Sheets-Sheet 1
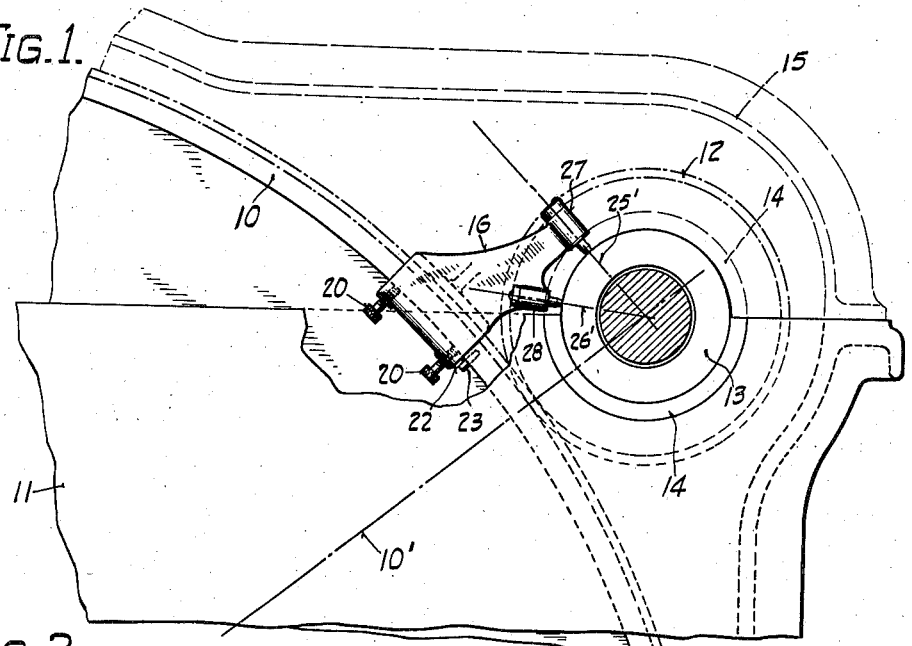
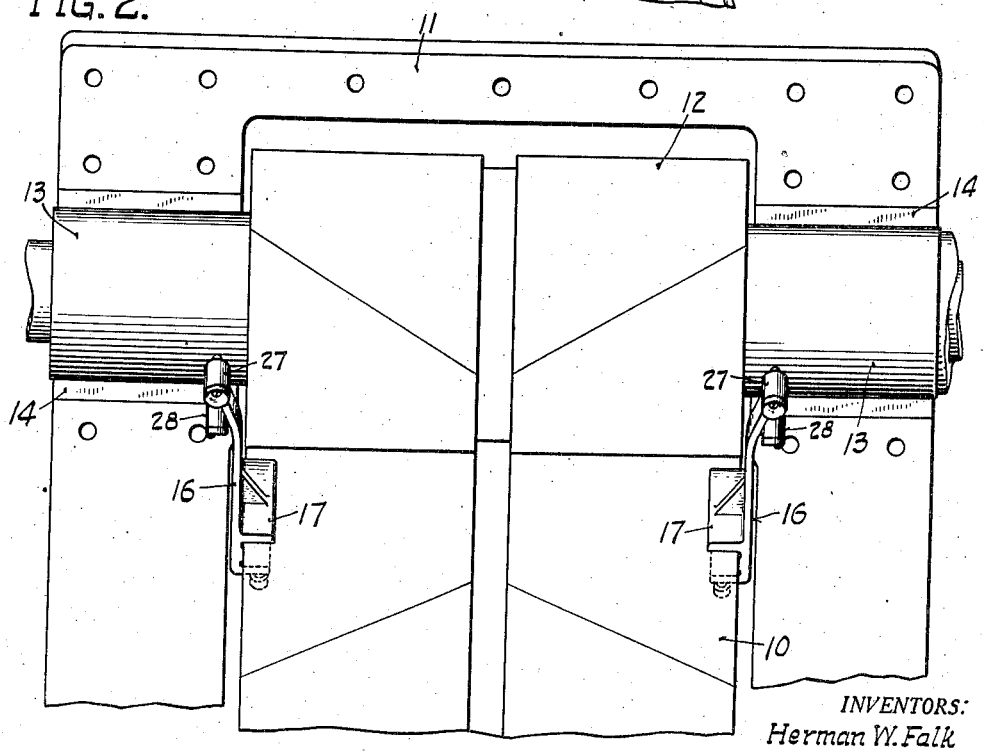
INVENTORS:
Herman W. Falk
William S. Henderson
BY
Ralph W. Brown
ATTORNEY.

Jan. 3, 1939.  H. W. FALK ET AL  2,142,723
MEANS FOR CORRELATING GEARS
Filed Sept. 18, 1935   2 Sheets-Sheet 2
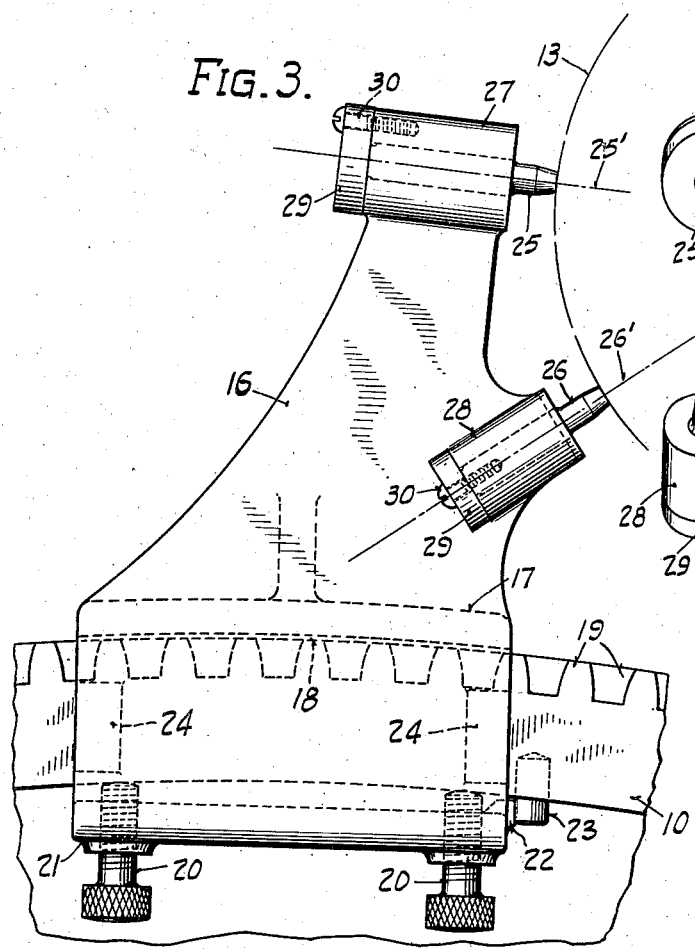
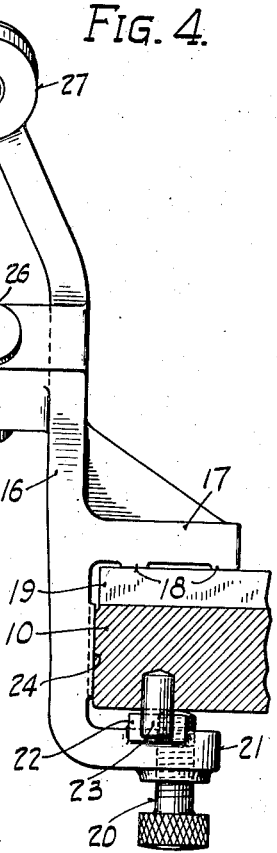
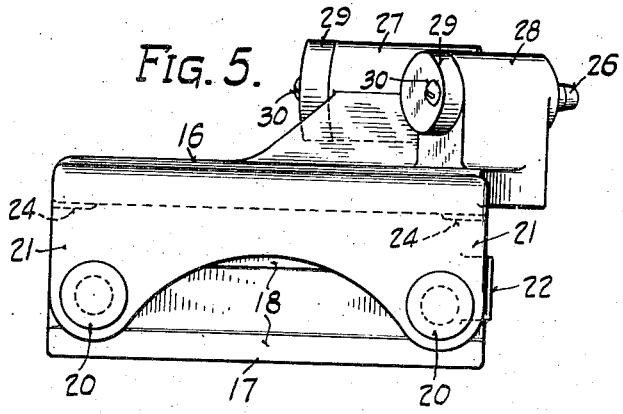
INVENTORS:
Herman W. Falk
BY William S. Henderson
Ralph Lew Brown
ATTORNEY.

Patented Jan. 3, 1939

2,142,723

UNITED STATES PATENT OFFICE 2,142,723

MEANS FOR CORRELATING GEARS

Herman W. Falk and William S. Henderson, Milwaukee, Wis., assignors to The Falk Corporation, Milwaukee, Wis., a corporation of Wisconsin Application September 18, 1935, Serial No. 41,095

3 Claims. (Cl. 33—182)

This invention relates to a new means for correlating mating gears.

In heavy duty gearing of the type employed in marine drives and other heavy duty power plants, absolute parallelism between the axes of mating gears is essential to proper gear action. Any slight departure from a theoretically correct positional relation between the gears causes noise and premature wear. This is particularly true in the case of large wide-faced gears and particularly so of those which operate at high peripheral speeds.

Even though the gear housing and bearings be accurately produced, finished, and assembled in accordance with good shop practice, they cannot be relied upon to establish proper relation between the gears because of errors which enter into the structure as a result of shrinkage and warpage of the housing, imperfect foundation, and other causes.

The purpose of the present invention is to provide an improved method and means for detecting any departure from a theoretically correct relation between a pinion and its mating gear and for guiding one in establishing that relation.

Another object is to provide an improved gauge for correlating mating gears.

Other more specific objects and advantages will appear, expressed or implied, from the following description of an exemplification of the invention.

In the accompanying drawings:—

Figure 1 is a fragmentary side elevation of a conventional gear set illustrating the application and use of correlating gauge constructed in accordance with the present invention.

Fig. 2 is a top plan view with the gear housing cover removed.

Fig. 3 is a face view of the gauge on a larger scale.

Fig. 4 is an edge view of the gauge.

Fig. 5 is a bottom end view.

The gear set shown in Figs. 1 and 2 is of conventional design. It includes a large gear 10 journalled in the usual manner in a housing 11 and meshing with a pinion 12 by which it is driven. In this instance the pinion 12 is formed integral with its supporting shaft 13 and journalled at each end in two-part sleeve bearings 14 provided in and between the housing 11 and its cover 15.

To check the positional relation of the pinion 12 with respect to the gear 10, two gauges 16 are employed detachably but securely fixed at selected points on the opposite edges of the gear rim and associated with opposite ends of the pinion shaft 13 in a manner to be later explained. Each gauge is a counterpart of the other so that a description of one will suffice for both.

As shown more particularly in Figs. 3, 4 and 5, each gauge comprises a bracket arm 16 having a supporting clamp plate 17 projecting laterally from one face of the arm 16 and longitudinally curved to match the curvature of the gear rim 10. Two laterally spaced, longitudinally extending pads 18 formed on the under face of the plate 17 are accurately machined to seat squarely against the tops of the gear teeth 19. Two clamp screws 20, threaded in ears 21 on the bottom of the arm 16, cooperate with the inner face of the gear rim 10 to securely fix the arm on the rim.

In order to accurately position the arm 16 at a definite location on the gear rim 10, the arm is further provided with a lug 22, on one of the ears 21, which has a machined face for engagement with a locating pin 23 fixed in the rim and projecting from the inner surface of the rim; and two pads 24, formed on the arm 16 intermediate the plate 17 and the ears 21, are provided with machined faces adapted to bear against the edge of the gear rim at peripherally spaced points thereon.

It will be noted that by means of the bearing pads 18, screws 20, pads 24, and lug 22 with its cooperating pin 23 the bracket arm 16 may be securely fixed to the gear rim at a very definite location thereon and in such manner as to project in a very definite direction therefrom.

The bracket arm 16 is also provided with two laterally spaced, angularly related gauge fingers in the form of pins 25 and 26 closely fitted for longitudinal adjustment in appropriate bosses 27 and 28 carried by the arm 16 and offset laterally therefrom. The pins 25 and 26 are arranged to contact an end of the pinion shaft 13 at peripherally spaced points thereon and preferably so related that, when the arm 16 is applied to the gear rim 10 in the manner above described, the axes 25' and 26' of the pins lie in a common plane at right angles to the axis of the pinion shaft and intersect each other at a point within the axis of the pinion shaft when the pinion 12 and gear 10 are properly related. The axis of pin 25' of pin 25 is preferably disposed at right angles to a line 10' connecting the center of the gear with the theoretically correct center of the pinion.

Each pin 25 and 26 is provided with a head 29 adapted to seat squarely against the outer end face of its supporting boss 27 or 28 and is retained against rotation and against accidental withdrawal by appropriate means, such as a screw 30 which extends loosely through the head 29 into the supporting boss.

In the production and finishing of gears of the type referred to herein they are thoroughly tested for accuracy and strength and lapped in prior to final assembly, and in the course of such treatment they are placed in a precision machine which may be relied upon to effect a theoretically correct positional relation between the pinion and gear. By the use of the gauges 16 hereinabove described this precise relationship between the pinion and gear may be reestablished after they have been transferred to the housing in which they are to be finally assembled and used.

To accomplish this a pair of gauges 16 are securely fixed to opposite edges of the gear rim 10, in the manner above described, with the lug 22 of each bearing against a locating pin 23 while the gear and pinion are in the precision machine. The gear 10 is then rotated very slowly until both gauge pins 25 and 26 of each gauge make contact with an end of the pinion shaft 13. The longitudinal position of each gauge pin in its supporting boss is then determined in any approved manner by measuring the clearance between the head 29 of each pin and the adjacent end face of its supporting boss. A feeler gauge may be used for this purpose. The position of each gauge pin is then recorded on an appropriate chart and the gauges removed from the gear.

Then, after assembly of the gear and pinion in their housing, the gauges 16 are again fixed to opposite edges of the gear in exactly the same positions as before, and the gear again slowly rotated until one of the pins 25 or 26 contacts the pinion shaft and assumes the same longitudinal position in its supporting boss as was recorded on the chart. Then, if the pinion is in its proper position, the longitudinal position of the other gauge pins in their respective supporting bosses will also correspond to that recorded on the chart.

Otherwise adjustment of the pinion shaft will be necessary, and the actual positions of the several gauge pins in their respective bosses will serve as a guide in determining the direction in which adjustments will have to be made to bring the pinion shaft to its correct position. Ordinarily such adjustments may be accomplished by wedging or shimming up one or another of the corners of the gear housing; otherwise slight adjustment of the pinion or gear bearings may be necessary.

It will of course be understood that by the use of the two gauges 16 in the manner above described the position of the axis of the pinion shaft with reference to predetermined points on the periphery of the gear is very accurately determined, the locating pins 23 on the opposite edges of the gear rim determining the reference points on the gear, and the two-point contact of each gauge with an end periphery of the pinion shaft serving to very definitely locate the pinion shaft relative to those reference points.

The gauges thus serve to compare the relative positions of the pinion and gear in their final assembly with their prior theoretically correct positions, as originally established in the shop machine, and also serve as a guide in reproducing that theoretically correct relationship in their final assembly.

Various changes may be made in the embodiment of the invention hereinabove specifically described without departing from or sacrificing the advantages of the invention as defined in the appended claims.

We claim:—

1. A correlating gauge for a gear and mating pinion comprising the combination of a bracket arm, means for attaching the same in a predetermined position on and extending in a definite direction and distance from the gear, and a plurality of spaced members on said arm cooperating with the pinion shaft to determine the position of the latter relative to said arm.

2. A correlating gauge for a gear and mating pinion comprising the combination of a bracket arm, means for attaching the same in a predetermined position on and extending in a definite direction and distance from the gear, and a plurality of gauge fingers adjustably mounted on said arm for cooperation with the pinion to determine the position of the latter relative to said arm.

3. A correlating gauge for a gear and mating pinion comprising the combination of a bracket arm, means for attaching the same in a predetermined position on and extending in a definite direction and distance from the gear, and a plurality of gauge pins longitudinally adjustable in said arm for contact with the pinion shaft at peripherally spaced points thereon.

HERMAN W. FALK.
WILLIAM S. HENDERSON.